(12) United States Patent
Belshan

(10) Patent No.: US 12,092,227 B1
(45) Date of Patent: Sep. 17, 2024

(54) VALVE ASSEMBLY AND SYSTEM, METHOD, AND APPARATUS THEREOF

(71) Applicant: SPM Oil & Gas Inc., Fort Worth, TX (US)

(72) Inventor: Daryl James Belshan, Weatherford, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 0 days.

(21) Appl. No.: 18/119,363

(22) Filed: Mar. 9, 2023

(51) Int. Cl.
*F16K 15/02* (2006.01)
*F04B 53/10* (2006.01)
*F16K 1/36* (2006.01)
*F16K 1/46* (2006.01)

(52) U.S. Cl.
CPC ............ *F16K 1/46* (2013.01); *F04B 53/1032* (2013.01); *F16K 1/36* (2013.01); *F16K 15/028* (2013.01); *Y10T 137/7866* (2015.04)

(58) Field of Classification Search
CPC .... F04B 53/1032; F16K 15/028; F16K 15/08; Y10T 137/7866
See application file for complete search history.

(56) References Cited

U.S. PATENT DOCUMENTS

| | | | |
|---|---|---|---|
| 2,263,750 A * | 11/1941 | Willke | F16K 1/42 251/114 |
| 5,119,858 A * | 6/1992 | Dartnall | F16K 15/06 137/516.25 |
| 8,317,498 B2 | 11/2012 | Gambier et al. | |
| 9,631,739 B2 | 4/2017 | Belshan et al. | |
| 9,822,894 B2 | 11/2017 | Bayyouk et al. | |
| 10,134,257 B2 | 11/2018 | Zhang et al. | |
| 11,111,915 B2 | 9/2021 | Bayyouk et al. | |
| 11,225,963 B2 | 1/2022 | Naedler et al. | |
| 11,448,210 B2 | 9/2022 | Bayyouk et al. | |
| 2020/0191286 A1* | 6/2020 | Iannetti | F16K 15/028 |
| 2021/0148474 A1* | 5/2021 | Leys | F16K 27/0209 |

* cited by examiner

*Primary Examiner* — Kevin F Murphy
(74) *Attorney, Agent, or Firm* — Xsensus, LLP

(57) ABSTRACT

A valve assembly and system, method, and apparatus thereof can comprise a valve body having a side surface and a valve body contact surface; a ring surrounding the valve body such that an inner surface of the ring is slidably engaged with the side surface of the valve body; and a retainer at an upper surface of the ring and movable with the ring relative to the valve body such that the retainer moves with the ring as the ring slides along the side surface of the valve body.

20 Claims, 9 Drawing Sheets

VALVE ASSEMBLY AND SYSTEM, METHOD, AND APPARATUS THEREOF

TECHNICAL FIELD

The present disclosure relates to a valve assembly and system, method, and apparatus thereof. In particular, the present disclosure relates to a valve having a self-adjusting portion, and systems, methods, and apparatuses thereof.

BACKGROUND

Hydraulic fracturing uses fluid pressurized to high pressures, up to 15,000 or even 20,000 psi, for instance, to crack open rock formation. The pumps and components used in this environment must also be able to withstand these high pressures. Typical hydraulic fracturing pumps may use check valves to allow the fluid to flow in only one direction, sealing the high-pressure side from the low-pressure side. Such check valves may have a metal base with a non-metallic ring on the metal base. The combination of the metal base and non-metallic ring can allow the valve to seal when closed, i.e., seated on the valve seat. A problem may exist that as the metal wears down over time, the wear can cause the non-metallic ring to undesirably deflect or compress. Eventually, the undesirable deflection or compression can cause the non-metallic ring to fail, which, as a result, can cause the valve sealing to be compromised.

U.S. Pat. No. 8,317,498 ("the '498 patent") describes a pump assembly having a valve equipped with a conformable valve insert that is configured with a circumferential component having the capacity to reduce the radial strain of its own deformation upon its striking of a valve seat at the interface within the pump assembly. According to the '498 patent, the conformable valve insert deforms when moving from a position away from a given valve seat to striking the valve seat.

SUMMARY

In an aspect according to embodiments of the present disclosure, a valve assembly is described or can be implemented. The valve assembly can comprising: a valve body having a side surface and a valve body contact surface; a ring, which can be comprised of urethane, the ring surrounding the valve body such that an inner surface of the ring is slidably engaged with the side surface of the valve body; and a retainer at a first surface of the ring and movable with the ring relative to the valve body such that the retainer moves with the ring as the ring slides along the side surface of the valve body.

In an aspect according to embodiments of the present disclosure, a method is described or can be implemented. The method, which can be regarding a valve assembly, can comprise: providing a valve body of the valve assembly, the valve body defining a radial side surface and a valve contact surface on a first side of the valve body, the valve contact surface being adjacent to the radial side surface of the valve body; providing a ring, the ring circumscribing the valve body such that an inner surface of the ring directly contacts the radial side surface of the valve body; and providing a retainer ring, the retainer ring being fixed to the ring such that at least a portion of an upper surface of the ring is covered by the retainer ring, wherein the ring is slidably movable along the radial side surface of the valve body, in concert with the retainer ring.

In an aspect according to embodiments of the present disclosure, a valve assembly with self-adjusting valve portion is described or can be implemented. The valve assembly with self-adjusting valve portion can comprise a valve movable in an axial direction of the valve assembly relative to a contact surface as a seat; and a biasing member in contact with the valve and movable in the axial direction of the valve assembly responsive to operation of the valve, wherein the valve can include: a valve body having a radial side surface and a valve contact surface, on a bottom side of the valve body, configured to contact the contact surface, the valve contact surface being adjacent to the radial side surface of the valve body, a ring as the self-adjusting valve portion, the ring circumscribing the valve body such that an inner surface of the ring directly contacts the radial side surface of the valve body, wherein a bottom surface of the ring contacts the contact surface under a condition that the valve is seated on the contact surface, and a retainer ring bonded to the ring such that an upper surface of the ring is in contact with the retainer ring, wherein an entirety of the ring and an entirety of the retainer ring are operative to move together relative to the valve body at least under the condition that the valve is seated on the contact surface.

DETAILED DESCRIPTION

The present disclosure relates to a valve assembly and system, method, and apparatus thereof. In particular, the present disclosure relates to a valve with a self-adjusting portion, and systems, methods, and apparatuses thereof. According to one or more embodiments, the valve assembly (including plural valve assemblies) can be implemented in a pump, for instance, a fracturing or fracking pump.

Figure 1:
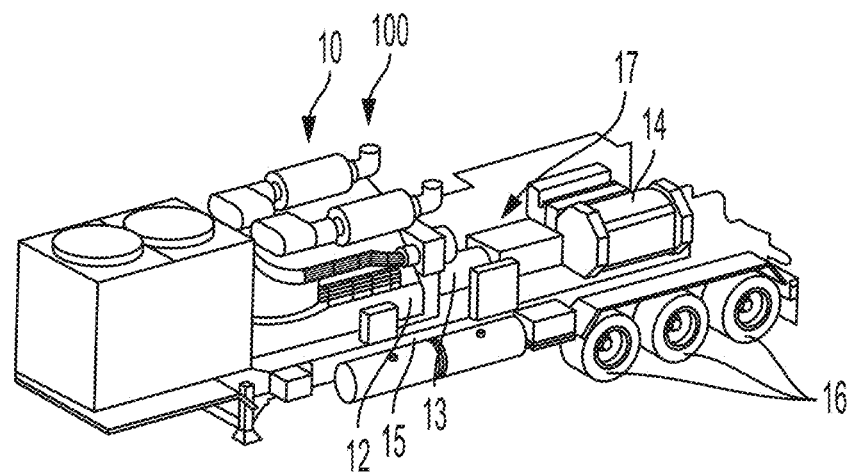
FIG. 1 is a perspective view of a pumping system supported on a trailer for transportation according to one or more embodiments of the present disclosure.

Referring to FIG. 1, FIG. 1 shows an example of a pumping system 10 particularly suited for use with geological fracturing processes to recover oil and/or natural gas from the earth, according to one or more embodiments of the present disclosure. The pumping system 10 may include a prime mover such as an internal combustion engine 12, a transmission 13 that can be operatively connected to and driven by the internal combustion engine 12, and a hydraulic pump 14 that can be operatively connected to and driven by the transmission 13. The hydraulic pump 14 may be (or may be characterized as) a positive displacement pump.

In one example, the internal combustion engine 12 may be a compression ignition engine that combusts diesel fuel. The hydraulic pump 14 may be configured to pump fracking fluid into the ground to fracture rock layers during the fracturing process. Because the fracturing process may require introduction of fracking fluids at different locations about the fracturing site, the components of the pumping system 10 may be supported on a mobile trailer 15 disposed on wheels 16 to enable transportation of the pumping system 10 about and to and from the fracturing site.

The transmission 13 may have gears operative between the internal combustion engine 12 and an output shaft of the transmission 13 to alter the rotational speed of the output from the internal combustion engine 12. In some instances, a gear mechanism or coupling 17 (schematically depicted) may be provided between the output shaft of the transmission 13 and an input or drive shaft 21 (shown in FIG. 2) of the hydraulic pump 14 to further change or reduce the rotational speed between the internal combustion engine 12 and the hydraulic pump 14.

Figure 2:
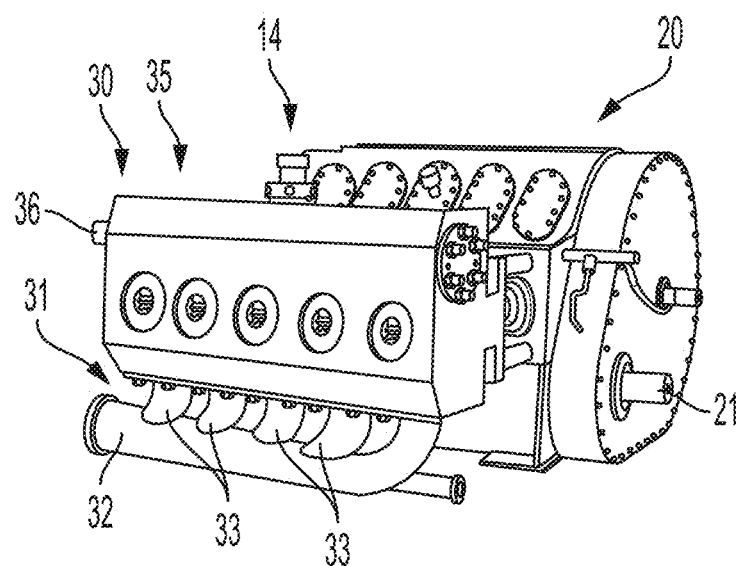
FIG. 2 is a perspective view of a hydraulic pump of the pumping system depicted in FIG. 1 according to one or more embodiments of the present disclosure.

As depicted in FIG. 2, the hydraulic pump 14 can include a power section 20 and a fluid section 30, which may be referred to as a power end and a fluid end, respectively. The power section 20 may include the input shaft 21 operatively connected to and driven by the transmission 13. The input shaft 21 may be operatively connected to a crankshaft through gears or other structure or mechanisms to convert rotational movement of the input shaft 21 into a linear movement at the fluid section 30 of the hydraulic pump 14.

Figure 3:
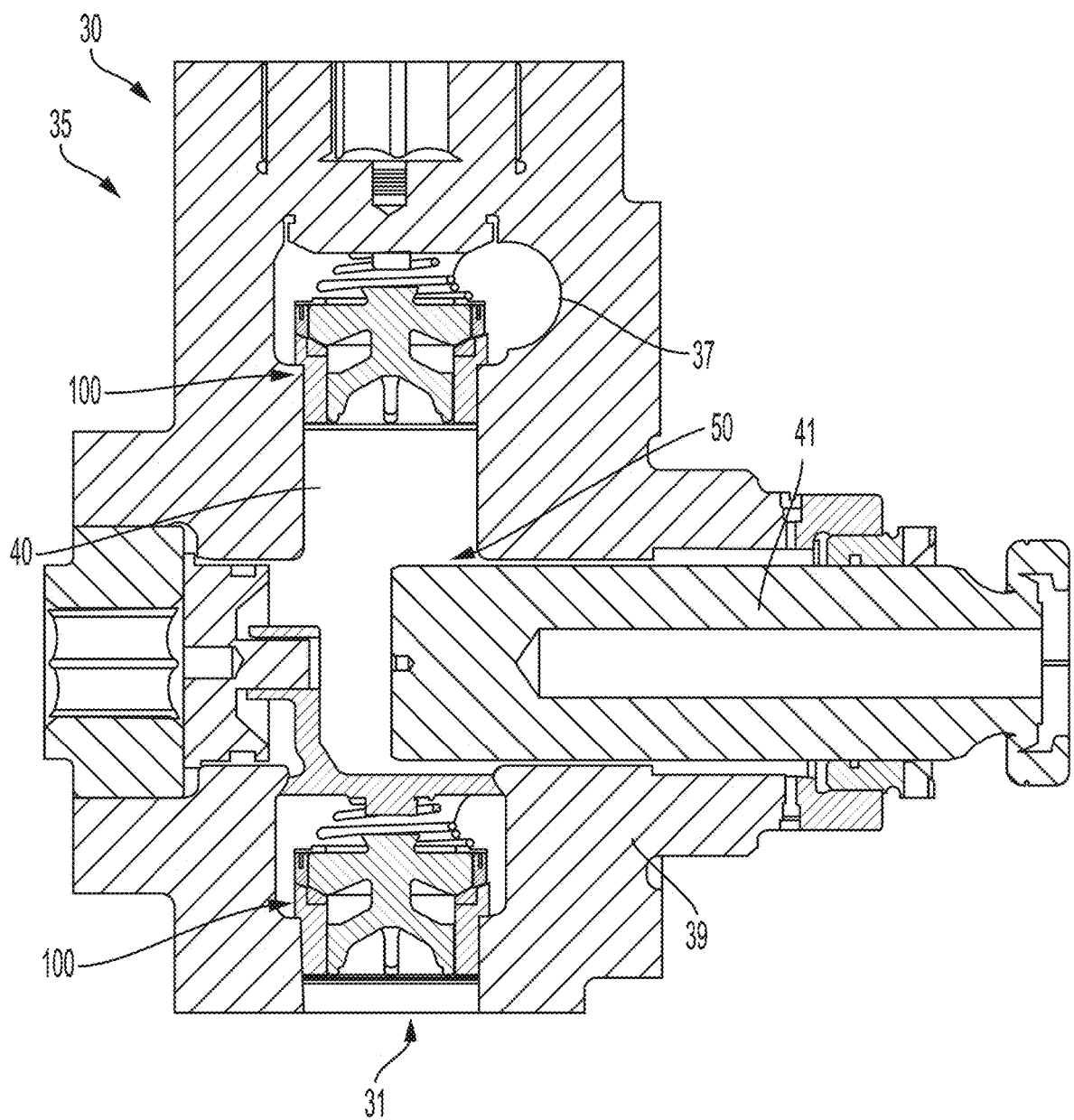
FIG. 3 is a sectional view of a portion of a fluid section of the hydraulic pump depicted in FIG. 2 according to one or more embodiments of the present disclosure.

Referring to FIG. 2 and FIG. 3, the fluid section 30 may include an inlet end 31 and an outlet end 35 spaced from the inlet end 31, with one or more cylinders 40 (e.g., five) disposed between the inlet end 31 and the outlet end 35. An inlet conduit may be fluidly connected to an inlet manifold 32 positioned at the inlet end 31. The inlet manifold 32 may include one or a plurality of inlet lines 33, with each inlet line 33 being fluidly connected to one of the cylinders 40. A discharge or outlet conduit 36 may be fluidly connected to an outlet 37 positioned at the outlet end 35. The outlet conduit 36 may be fluidly connected to the cylinders 40 via the outlet 37, for instance, at a location opposite one of the inlet line(s) 33 associated with the same cylinder 40.

Each cylinder 40 may be provided or formed in a body 39 of the fluid section 30 of the hydraulic pump 14. As such, each cylinder 40 may be referred to or characterized as a cylinder bore, or plunger bore. Each cylinder 40 may include a reciprocating member such as a reciprocating element 41 disposed for reciprocating sliding movement therein. The reciprocating element 41 may be a plunger or a piston, for instance. At least the cylinder 40 and the reciprocating element 41 can be referred to or characterized as a cylinder assembly 50.

As shown in FIG. 3, each of the inlet end 31 and the outlet end 35 can include a valve assembly 100. In the case of the valve assembly 100 disposed at inlet end 31, the valve assembly 100 can be regarded as a suction or inlet valve (assembly) positioned between a corresponding inlet line 33 and its associated cylinder 40. In one embodiment, the valve of the valve assembly 100 disposed at the inlet end 31 may be biased in a closed condition or position and moved to an open position to permit fracking fluid to pass therethrough and into the cylinder 40. In the case of the valve assembly 100 disposed at the outlet end 35, the valve assembly 100 can be regarded as a discharge or outlet valve (assembly) positioned between each outlet 37 and its associated cylinder 40. In one embodiment, the valve of the valve assembly 100 disposed at the outlet end 35 may be biased in a closed condition or position and moved to an open position to permit fracking fluid to pass therethrough to the outlet 37 upon the reciprocating element 41 generating a sufficient or high enough pressure.

During a pumping process, operation of the internal combustion engine 12 can drive rotation of the transmission 13 and ultimately rotation of the input shaft 21 of the hydraulic pump 14. Rotation of the input shaft 21 can cause reciprocating movement of the reciprocating element 41 within the cylinder 40 (including multiple reciprocating elements 41 and corresponding respective cylinders 40). The reciprocating movement of the reciprocating element 41 may cause fracking fluid to flow through the inlet manifold 32 from the inlet conduit and into the cylinder(s) 40 through the inlet line(s) 33 and past the valve assembly(ies) 100 at the inlet end 31. Fracking fluid can be driven by the reciprocating element(s) 41 past the valve assembly(ies) 100 at the outlet end 35 and into the outlet(s) 37. The fracking fluid, which can contain water, proppants (e.g., sand), and other additives, can be output from the fluid end 30 based on, or at, a predetermined pressure and according to a predetermined cycle of the reciprocating element 41. The predetermined pressure, which may be referred to or characterized as a maximum operating pressure of, or applied to, the fracking fluid, can be at or about 20,000 psi, as but one example.

Optionally, the pumping system 10 may be controlled, at least in part, by a control system as shown generally in FIG. 1. The control system may include an electronic control module (ECM) or controller. The control system may also include a plurality of sensors or may otherwise receive signals from the plurality of sensors. The controller may control various operations of the pumping system 10.

The controller may be an electronic controller that operates to perform operations, execute control algorithms, store, retrieve, and access data, and other desired operations. The controller may include or access memory, secondary storage devices, processors, and any other components for running one or more applications. The memory and secondary storage devices may be in the form of read-only memory (ROM) or random access memory (RAM) or integrated circuitry that is accessible by the controller. Various other circuits may be associated with the controller such as power supply circuitry, signal conditioning circuitry, driver circuitry, and other types of circuitry. The controller may be referred to or characterized as control circuitry according to one or more embodiments of the disclosed subject matter.

The controller may be a single controller or may include more than one controller disposed to control various functions and/or features of the pumping system 10. The term "controller," as used herein, is used in its broadest sense to include one or more controllers and/or microprocessors that may be associated with the pumping system 10 and that may cooperate in controlling various functions and operations of the pumping system 10. The functionality or operations of the controller may be implemented in hardware and/or software without regard to the functionality. The controller may rely on one or more data maps relating to the operating conditions and the operating environment of the pumping system 10 and the work site at which the pumping system 10 is operating that may be stored in the memory of or associated with the controller. Each of these data maps may include a collection of data in the form of tables, graphs, and/or equations. The control system and controller may be located on the trailer 15 or may be distributed with components additionally, or alternatively, located remotely from or off-board the trailer 15.

The above-discussed plurality of sensors of the pumping system 10 can provide data indicative (directly or indirectly) of various operating parameters of elements of the system and/or the operating environment in which the system is operating. The term "sensor," as used herein, is used in its broadest sense to include one or more sensors and related components that may be associated with the pumping system 10 and that may cooperate to sense various functions, operations, and operating characteristics of the element of the pumping system 10 and/or aspects of the environment in which the pumping system 10 is operating.

Figure 4:
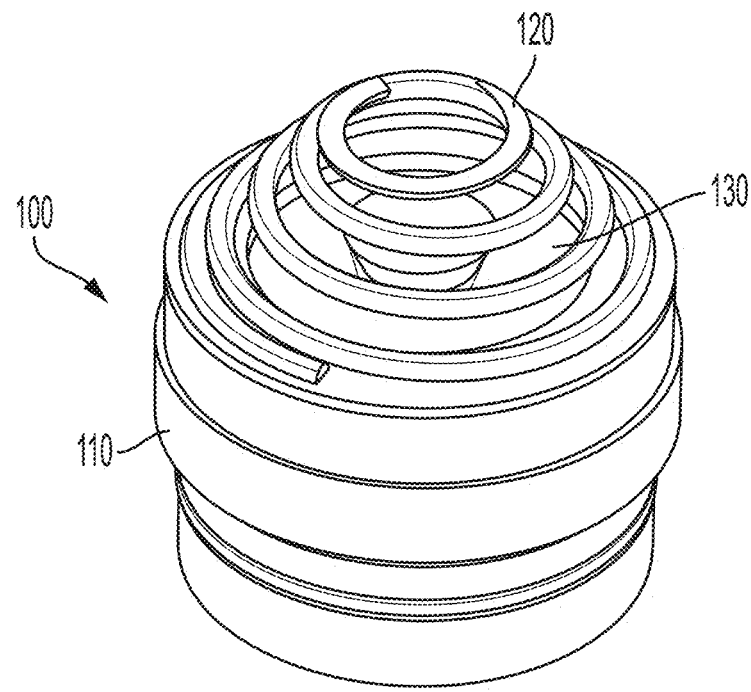
FIG. 4 is a top perspective view of a valve assembly according to one or more embodiments of the present disclosure.
Figure 5:
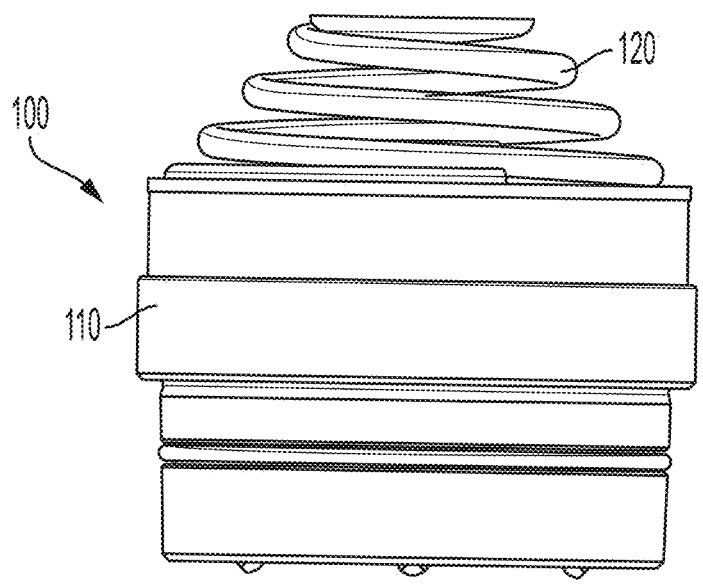
FIG. 5 is a side elevational view of the valve assembly of FIG. 4.
Figure 6:
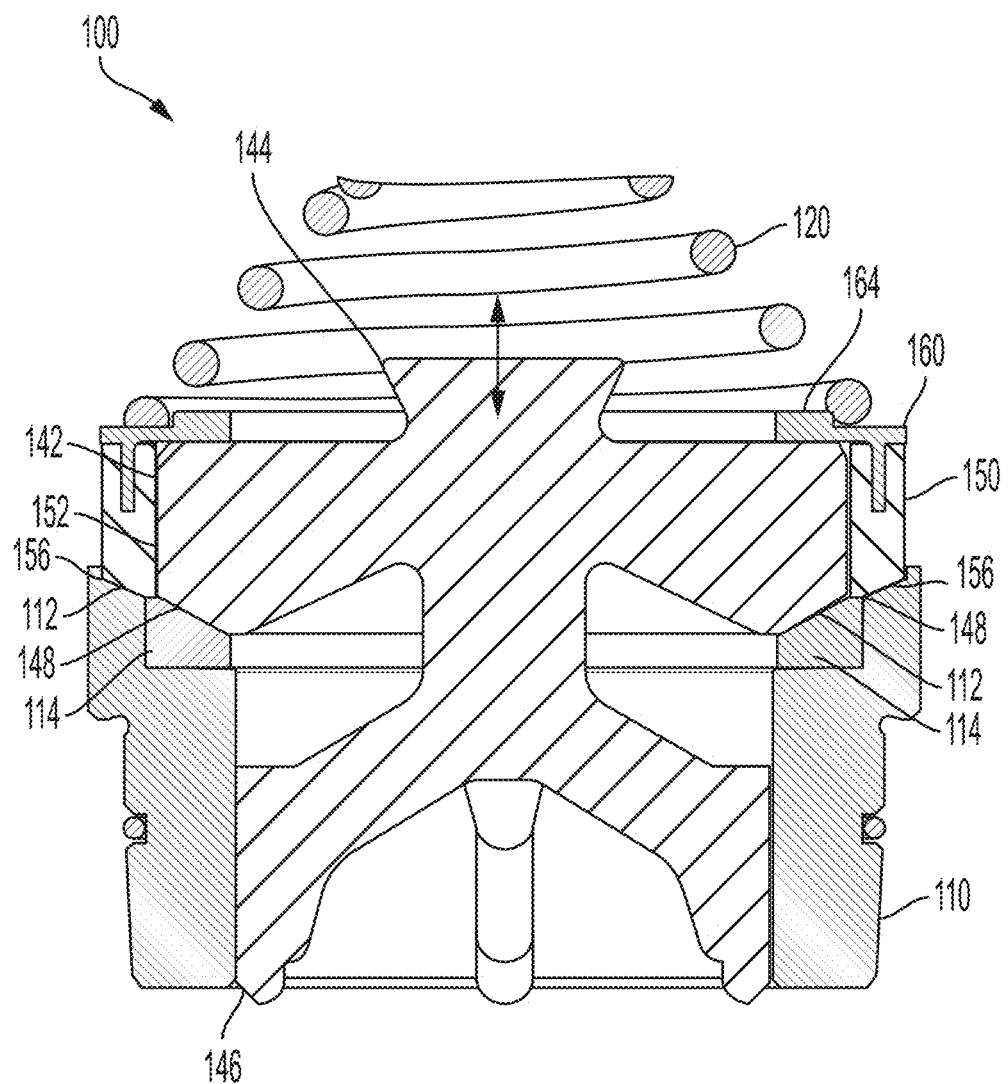
FIG. 6 is a side sectional view of the valve assembly of FIG. 4.

Turning now to FIGS. 4-6, these figures show in more detail the valve assembly 100, according to one or more embodiments of the present disclosure. According to one or more embodiments of the present disclosure, the valve assembly 100 may be regarded as a valve assembly with a self-adjusting valve portion.

Notably, the valve assembly 100 can comprise a base 110, a valve 130, and a biasing member 120, which can be a spring, on the valve 130. Optionally, the biasing member 120 in the form of a spring can taper in thickness from thick at the interface with the valve 130 to thin going away from the interface with the valve 130. As shown in FIG. 6, a portion of the valve 130 can be disposed inside an opening formed by the base 110. Hence, the base 110 may be regarded as hollow. Generally, the valve 130 and the biasing member 120 are operative to move in an axial direction of the valve assembly 100 relative to the base 110. The biasing member 120 is thus operative to move in the axial direction responsive to operation of the valve 130. Incidentally, FIG. 6 shows the valve 130 in a fully closed position, seated on the base 110.

Still referring to FIG. 6, the base 110, which can be metallic or formed of metal, can define or otherwise have a base contact surface 112. In that the valve 130 can be seated in the base 110 such that a portion of the valve 130 contacts the base contact surface 112, the base contact surface 112 may be regarded as a seat. Optionally, the base contact surface 112 can have multiple contact portions. For instance, according to one or more embodiments, the base contact surface 112 can have a hardened portion 114, which can be harder than another portion of the base contact surface 112, such as a radially outward portion of the base contact surface 112. As an example, the hardened portion 114 may be made of tungsten carbide.

Figure 7:
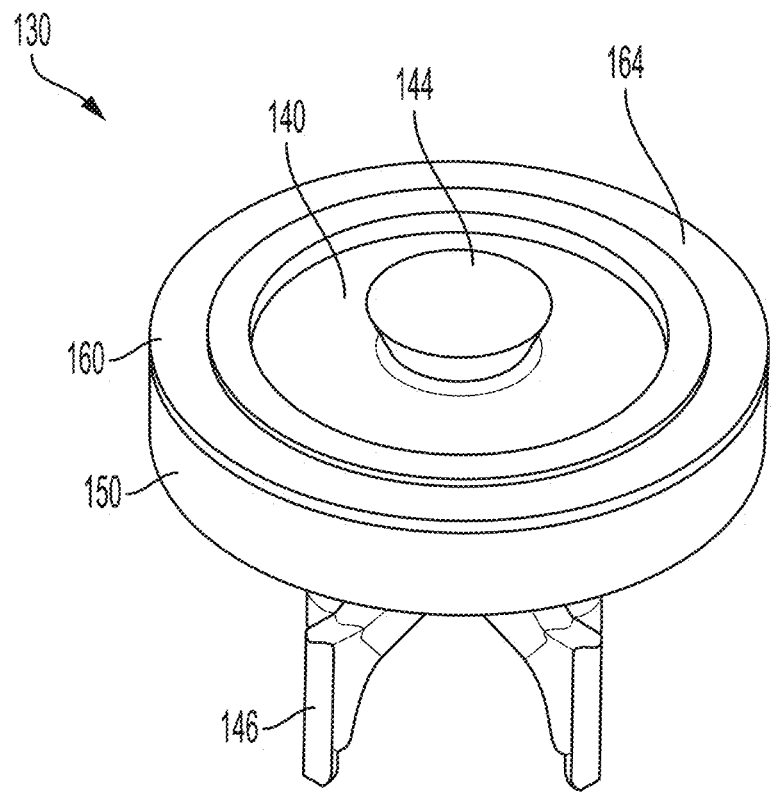
FIG. 7 is a top perspective view of a valve according to one or more embodiments of the present disclosure.
Figure 8:
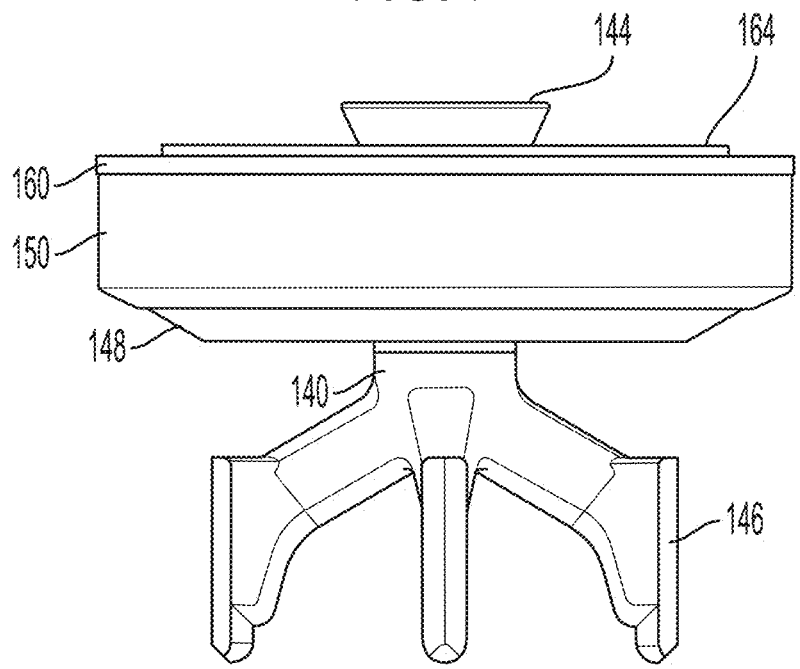
FIG. 8 is a side elevational view of the valve of FIG. 7.
Figure 9:
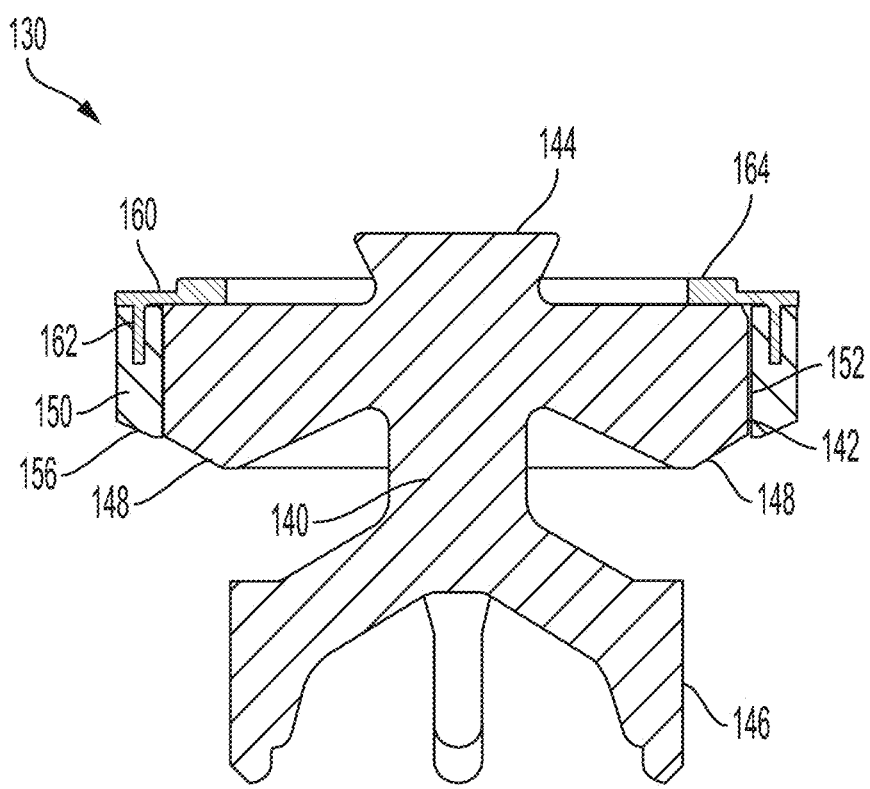
FIG. 9 is a side sectional view of the valve of FIG. 7.

Referring now also to FIGS. 7-9, the valve 130 can include a valve body 140, a ring 150, and a retainer 160. Optionally, the valve 130 can consist of the valve body 140, the ring 150, and the retainer 160. In that the valve 130 includes multiple parts, the valve 130 itself may be regarded as a valve assembly.

The valve body 140, which can be made of metal, can define or otherwise have a side wall or surface 142, a head 144, and one or more legs 146. As shown in FIG. 6 and FIG. 9, the head 144 may extend from a top side of the valve body 140 and the one or more legs 146 may extend from a bottom side of the valve body 140. The top side of the valve body 140 and the bottom side of the valve body 140 may be regarded as a first side and a second side of the valve body 140, respectively, or vice versa. In that the side surface 142 can face radially outward (from a central longitudinal axis of the valve body 140), the side surface 142 may be regarded as a radial side surface. The valve body 140 can have a valve contact surface 148 on the bottom side thereof. The valve contact surface 148 can be to contact the base contact surface 112. Optionally, the valve contact surface 148 can contact the hardened portion 114 of the base contact surface 112, for instance, only the hardened portion 114 and no other portion of the base contact surface 112. An outer edge of the valve contact surface 148 can form a bottom of the side surface 142 of the valve body 140.

Figure 11:
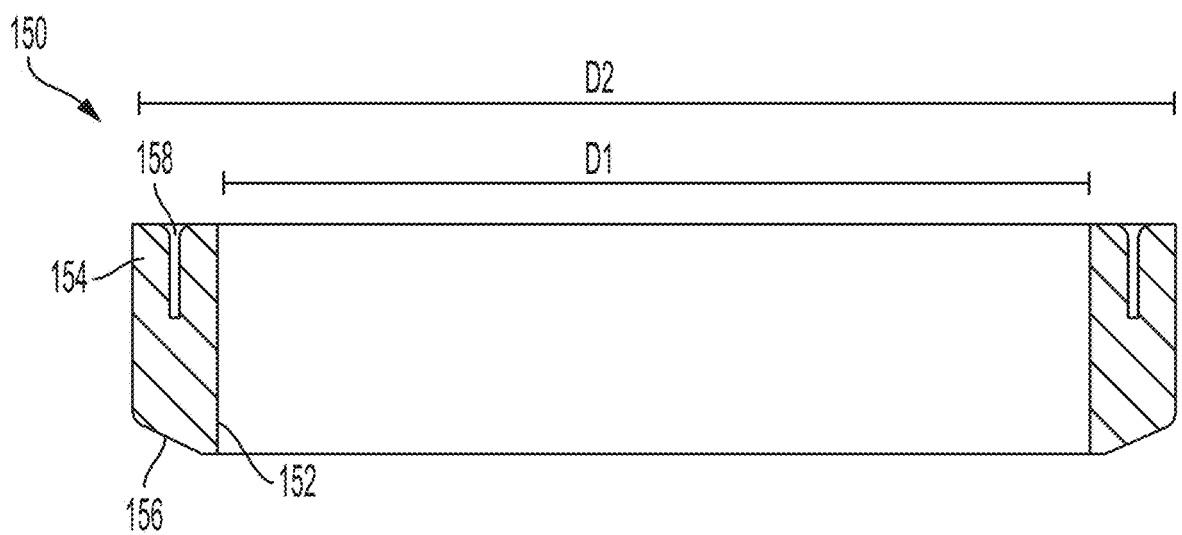
FIG. 11 is a side sectional view of second portion of the valve of FIG. 7 according to one or more embodiments of the present disclosure.

Referring now to FIG. 9 and FIG. 11, the ring 150 can be comprised of a non-metallic or non-metal compressible material such as urethane or rubber. An inner surface 152 of the ring 150 can be constant from a first end or side of the ring 150 to a second end or side of the ring 150 opposite the first end of the ring 150. That is, the ring 150 can have the same inner diameter D1 from the first end to the second end, such as shown in FIG. 11. Optionally, an outer surface 154 of the ring 150, which can define an outer diameter D2 of the ring 150, can be constant from the top surface of the ring 150 to the bottom surface of the ring 150, such as shown in FIG. 11. Alternatively, the outer diameter of the ring 150 may not be constant.

Discussed in more detail below, the ring 150 can have a recess 158, which can extend around an entire circumference of the ring 150, to receive a portion of the retainer 160. The recess 158, which can have a length greater than a width, can extend into the ring 150 from an upper or top surface of the ring 150 opposite a bottom wall or surface 156 of the ring 150, such as shown in FIG. 11.

The valve contact surface 148 can be disposed adjacent to the side surface 142 of the valve body 140. The bottom surface 156 of the ring 150 may be adjacent (e.g., being positioned proximate the outer diameter) of the valve contact surface and facing in the same direction (e.g., within 5 degrees) or similar direction (e.g., within 45 degrees) as the valve contact surface 148. The bottom wall or surface 156 of the ring 150 can complement a portion of the base contact surface 112 of the base 110. For instance, as shown in FIG. 6, both the base contact surface 112 and the bottom surface 156 of the ring 150 can be at the same angle relative to horizontal. Thus, the bottom surface 156 of the ring 150 can contact the base contact surface 112 under a condition where the valve 130 is seated on the base 110. In this regard, the bottom surface 156 of the ring 150 may be regarded as a contact surface. Further, the ring 150 can form a seal to prevent the escape of pressurized fluid through the valve assembly 100 when the valve 130 is closed. In some examples, the bottom surface 156 of the ring 150 may extend, towards the base contact surface 112, past the valve contact surface 148 (e.g., when the valve contact surface 148 has worn), as shown in FIG. 9.

The ring 150 may be disposed so as to circumscribe or surround a portion of the valve body 140. In particular, the ring 150 can be disposed to surround or circumscribe the valve body 140 such that the inner wall or surface 152, which can define the inner diameter D1 of the ring 150, can directly contact the side surface 142 of the valve body 140. According to one or more embodiments, an entirety of the side surface 142 of the valve body 140 can be covered by the inner surface 152 of the ring 150, such as shown in FIG. 9. Put another way, a height of the ring 150 in the axial direction of the valve 130 or valve assembly 100, for instance, a height of the inner surface 152, can be such that no portion of the side surface 142 of the valve body 140 is exposed to outside the valve 130. The side surface 142 and the inner surface 152 can also extend in adjacent planes, for instance, parallel to the longitudinal axis of the valve body 140 or valve assembly 100. Additionally, the ring 150 can be disposed to surround or circumscribe the valve body 140 such that the inner surface 152 of the ring 150 is slidably engaged with the side surface 142 of the valve body 140. Thus, the ring 150 may move axially relative to the valve body 140 during operation of the valve assembly 100. At least when the valve contact surface 148 of the valve body 140 contacts the base contact surface 112 at the end of a down-cycle of movement of the valve body 140, the bottom surface 156 of the ring 150 can contact the base contact surface 112, and the ring 150 can be regarded as a self-adjusting valve portion of the valve 130. In some examples, the valve contact surface 148 may contact the base contact surface 112 before and/or concurrently with contact of the bottom surface 156 of the ring 150 with the base contact surface 112. In some other examples, such as when the valve contact surface 148 has worn, the valve contact surface 148 may contact the base contact surface 112 after contact of the bottom surface 156 of the ring 150 with the base contact surface 112 and/or concurrently with or following initial axial movement of the ring 150 relative to the valve body 140.

The retainer 160 can be metallic or comprised of metal, such as heat-treated carbon steel or stainless steel, as examples. The retainer 160, which can be in the form of a ring, can be disposed to cover a portion of the top or upper surface of the ring 150. For instance, as shown in FIG. 9, the retainer 160 can be disposed to cover an entire upper surface of the ring 150. In this regard, an outer diameter D3 of the retainer 160 can be greater than the outer diameter D2 of the ring 150, and an inner diameter D4 of the retainer 160 can be less than the inner diameter D1 of the ring 150. Optionally, the outer diameter D3 of the retainer 160 and/or the outer diameter D2 of the ring 150 can be less than an outer diameter of the base 110, such as shown in FIG. 6.

Figure 10:
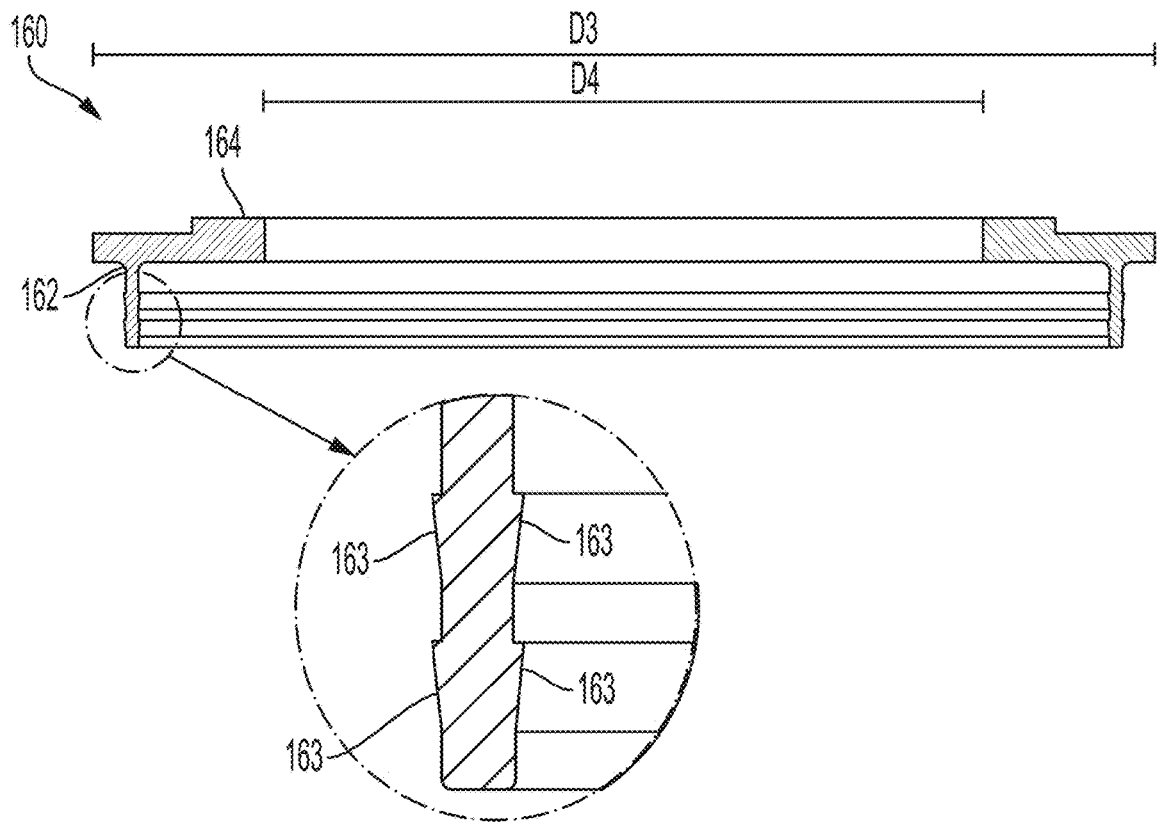
FIG. 10 is a side sectional view of a first portion of the valve of FIG. 7 according to one or more embodiments of the present disclosure.

The retainer 160 can be fixed at, or to, the top or upper surface of the ring 150. For instance, the retainer 160 can be bonded (e.g., via a bonding chemical agent) to the upper surface of the ring 150. As another example, the ring 150 can be injection molded onto the retainer 160 such that the retainer 160 is fixed at, or to, the top or upper surface and the ring 150. Optionally, as shown in FIG. 10, for instance, the retainer 160 can include a projection 162, which may be regarded as a projecting tab, and which may extend around an entire circumference of the retainer 160. The projection 162 can extend into the recess 158 of the ring 150 to fix the retainer 160 to the ring 150. According to one or more embodiments, the projection 162 can be bonded (e.g., via a bonding chemical agent) to the ring 150 when in the recess 158, thus fixing the retainer 160 to the ring 150. As another example, the ring 150 can be injection molded onto the projection 162 such that the retainer 160 is fixed to the ring 150. Additionally, or alternatively, the projection 162 can be bonded to the ring 150 (in the recess 158) via press-fit, for instance, using one or more sidecuts 163 formed on an inner side and/or an outer side of the projection 162, such as shown in FIG. 10. In some examples, multiple sidecuts 163 may be spaced apart along a length of the projection 162 to improve bonding of the retainer 160 to the ring 150.

According to one or more embodiments of the present disclosure, the top or upper surface of the retainer 160 can include a ridge 164, which may be disposed to extend around an entire circumference of the retainer 160. As shown in in FIG. 6, the bottom end of the biasing member 120 can be disposed to circumscribe the ridge 164 and directly contact the top surface of the retainer 160 radially outward of the ridge 164.

Figure 13:
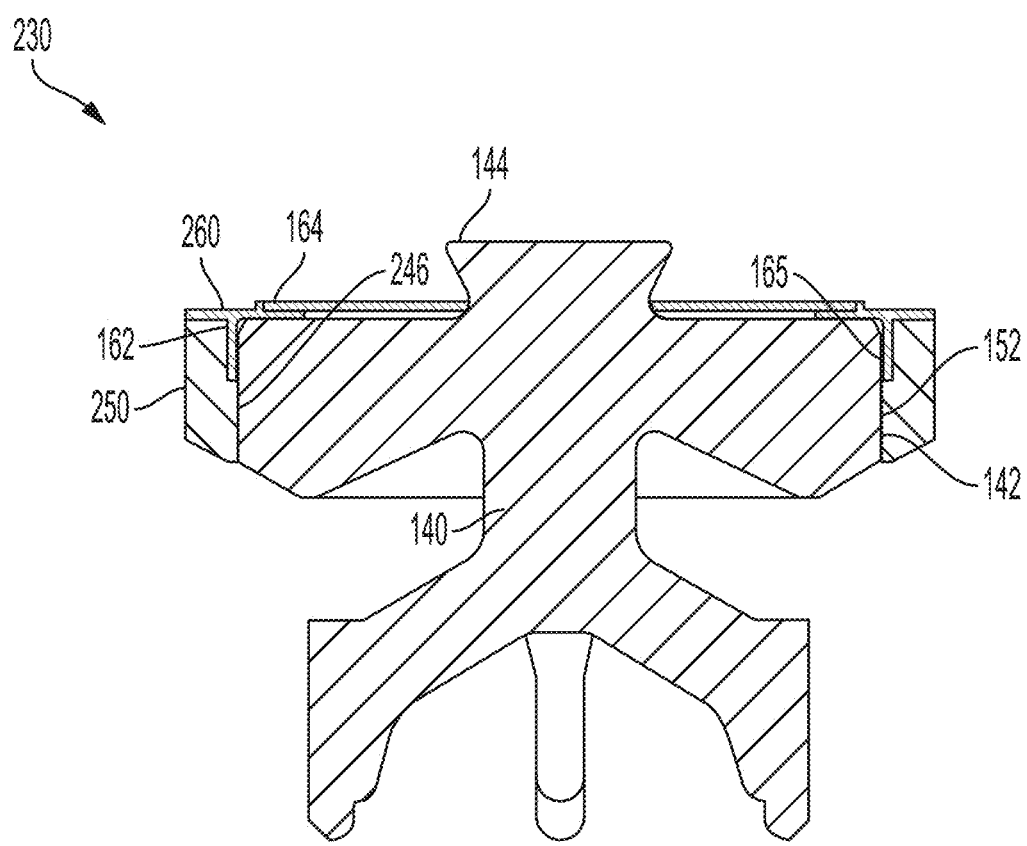
FIG. 13 is a side sectional view of another valve according to one or more embodiments of the present disclosure.

Referring now to FIG. 13, FIG. 13 shows a side sectional view of another valve 230 according to one or more embodiments of the present disclosure. The valve 230 can include the valve body 140, a ring 250, and a retainer 260. Optionally, the valve 230 can consist of the valve body 140, the ring 250, and the retainer 260. In that the valve 230 includes multiple parts, the valve 230 itself may be regarded as a valve assembly. The valve 230 is similar to valve 130 above except for the placement of the projection 162 of the retainer 260 relative to the ring 250. Notably, the projection 162 is fixed (e.g., bonded) to the ring 250 at the inner surface 152 of the ring 250, for instance, such that an inner surface 165 of the projection 162 is coplanar with the inner surface 152 of the ring 250. Thus, the ring 250 and the projection 162 can be disposed to directly contact and cover the side surface 142 of the valve body 140. For instance, as shown in FIG. 13, an entirety of the side surface 142 of the valve body 140 can be covered by a combination of the inner surface 152 of the ring 250 and the inner surface 165 of the projection 162 of the retainer 260. In some examples, a portion of the retainer 260 may extend from the ridge 164 to the head 144 of the valve body 140 (e.g., to contact the head 144 as shown in FIG. 13). The portion of the retainer 260 that extends from the ridge 164 to the head 144 may be flexible to allow the retainer 260 to be fixed with the valve body 140 during axial movement of the ring 250 and the retainer 260 relative to the valve body 140 during operation of the valve assembly 100. In some examples, the retainer 260 may include only a single piece, or multiple pieces (e.g., two) as shown in FIG. 13.

INDUSTRIAL APPLICABILITY

As noted above, the present disclosure relates to a valve assembly and system, method, and apparatus thereof. In particular, the present disclosure relates to a valve with a self-adjusting portion, and systems, methods, and apparatuses thereof. According to one or more embodiments, the valve assembly (including plural valve assemblies) can be implemented in a pump, for instance, a fracturing or fracking pump.

Generally speaking, embodiments of the present disclosure implement a self-adjusting valve portion, particularly a ring made of a compressible material (e.g., urethane) that can move axially along the outer diameter of the metal valve body such that, as the metal of the valve body wears, the self-adjusting valve portion can move along the valve body and not be compressed beyond its limits. This can enable the valve to seal for much longer life, even as the metal wears.

In operation, a valve assembly, such as valve assembly 100, can be provided. The provided valve assembly can be comprised of a valve body, such as valve body 140, a ring, such as ring 150 or ring 250, and a retainer, such as retainer 160 or retainer 260. The valve body, the ring, and the retainer may be regarded as a valve or valve assembly, such as valve or valve assembly 130 or valve or valve assembly 230. The provided valve assembly 100 can also include a base, such as base 110, and a biasing member 120, such as a spring.

The valve body 140 can move axially relative to the base 110. Here, at least the ring 150/250 can slide along the side surface 142 of the valve body 140. The retainer 160/260 can move axially in concert with (i.e., together with) the ring 150/250. The valve body 140 can move axially upward and downward away from and toward the base 110, respectively.

In the case where the valve body 140 moves away from the base 110, the valve body 140, the ring 150/250, and the retainer 160/260 move together, against the biasing member 120 pushing down on the upper or top surface of the retainer 160/260. The biasing member 120 pushing down on the retainer 160/260 (which can be fixed to the ring 150/250) and/or an upward-facing shoulder of the valve body 140 that complements a downward-facing shoulder of the retainer 160/260, can prevent the ring 150/250 from coming off the valve body 140 in an axially downward direction as the valve body 140 moves axially upward. Thus, the retainer 160/260 and the ring 150/250 may not be fixed to the valve body 140, rather, the retainer 160/260 and the ring 150/250 may be held against the valve body 140 by the bias of the biasing member 120 as the valve body 140 moves away from the base 110. In fact, the biasing member 120 can contact the upper or top surface of the retainer 160/260 at all times during operation of the valve assembly 100, i.e., at a top-most position of the valve body 140, at a bottom-most position of the valve body 140, and at all positions therebetween. Movement upward of the valve or valve assembly 130 from a seated position on the base 110 to a non-seated position can allow for operating fluid to flow through the valve assembly 100.

Figure 12:
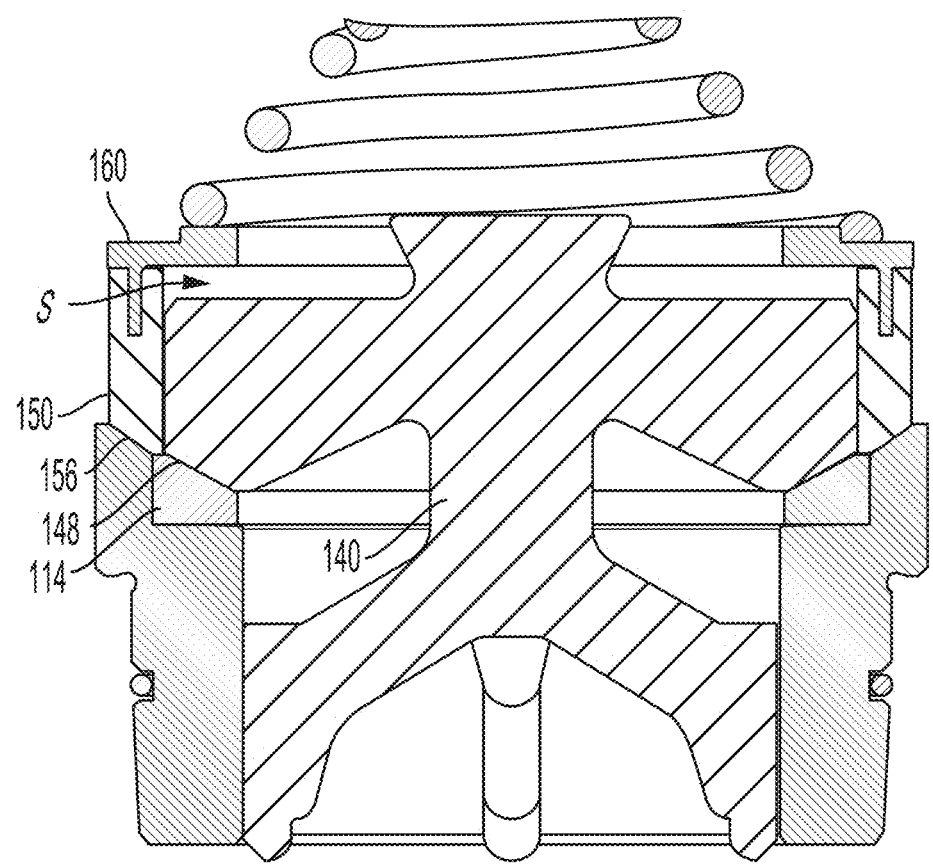
FIG. 12 is a side sectional view of the valve assembly of FIG. 4 with the ring and retainer moved upward.

In the case where the valve body 140 moves toward the base 110, the valve body 140, the ring 150/250, and the retainer 160/260 can move together, as the biasing member 120 pushes down on the upper or top surface of the retainer 160/260. Upon reaching the seat of the base, e.g., the base contact surface 112, the valve contact surface 148 and the bottom surface 156 of the ring 150/250 contact the base contact surface 112 and form a seal to close the valve assembly 100. In the case where the valve contact surface 148 has worn, when the valve contact surface 148 contacts the base contact surface 112 the ring 150/250 can slide axially along the side surface 142 of the valve body 140, up the valve body 140. FIG. 12 shows an example where the ring 150/250 has slid axially upward, away from the valve body 140, such that a space S exists between the bottom of the retainer 160 and an upper surface of the valve body 140 radially outward of the head 144 of the valve body 140, though the bottom surface 156 of the ring 150/250 still contacts the base contact surface 112. So as the metal of the valve contact surface 148 wears down, rather than being undesirably compressed (e.g., compressed greater than a predetermined threshold amount relative to a compression amount for a new or unworn valve contact surface 148), the ring 150/250 (and the retainer 160/260) can slide up axially along the outside of the valve body 140. As the ring 150/250 and the retainer 160/260 slide up the side surface 142 of the valve body 140, the retainer 160/260 can separate from the upper or top surface of the valve body 140, though the bias of the biasing member 120 can prevent the retainer 160/260 and ring 150/250 from coming off the valve body 140. In some examples, after the ring 150/250 (and the retainer 160/260) slide up axially along the outside of the valve body 140 to reach a new sealing position, based on wear of the valve contact surface 148, the ring 150/250 (and the retainer 160/260) may remain at the axial position corresponding to the new sealing position, rather than returning to the initial position (e.g., corresponding to unworn valve contact surface 148). In such examples, the bias of the biasing member 120 may be below a threshold that would cause the ring 150/250 (and the retainer 160/260) to return to the initial position (e.g., a threshold that is based on forces that resist sliding of the ring 150/250 (and the retainer 160/260) relative to the valve body (e.g., frictional forces, or other forces)).

Regarding operation in general, and referring to FIG. 3, as the plunger 41 begins to move to the right on a suction stroke, the inlet 31 has a precharged pressure. As the pressure of the bore chamber 40 drops because the plunger 41 retracts or moves to the right, the top valve 100 has the discharge pressure, which can be well bore pressure, so that the top valve 100 stays closed while the fluid is moved into the bore chamber 40. That is, the well bore pressure pushes down the valve body 140, the rigid retainer ring 160 (FIG. 6), and the ring 150 (FIG. 6) of the top valve 100 such that the bottoms of the valve body 140 and the ring 150 are sealingly seated on the contact surface. Also, as the pressure of the bore chamber 40 drops because the plunger 41 retracts or moves to the right, then that pressure becomes less than the pressure at the inlet 31, which can cause the bottom valve 100 to open so fluid can get pushed into the bore chamber 40 through the inlet 31.

Regarding opening of the bottom valve 100, in the case of the contact surface 148 of the valve body 140 not being worn, each of the valve body 140, the rigid retainer ring 160 (FIG. 6), and the ring 150 (FIG. 6) of the bottom valve 100 can be pushed upward by the pressure difference from the seated position shown in FIG. 6 to open the bottom valve 100. When the plunger 41 starts reciprocating back to the left, the movement leftward of the plunger 41 can increase the pressure in the bore chamber 40 to greater than at the inlet 31. Such pressure can push down on all three of the valve body 140, the rigid retainer ring 160, and the ring 150 (FIG. 6) of the bottom valve 100 such that the bottoms of the valve body 140 and the ring 150 are sealingly seated on the contact surface. The spring 120 of the bottom valve 100 can be provided to bias downward the rigid retainer ring 160 and the ring 150 in the event that the pressure inside the bore chamber 40 happens to be the same as at the inlet 31 initially at the start of the movement leftward of the plunger 41 to close the bottom valve 100.

In the case where the contact surface 148 of the valve body 140 first becomes worn, the contact surface 156 of the ring 150 may now extend past the contact surface 148 of the valve body 140. Upon that first occurrence of the contact surface 156 of the ring 150 extending past the contact surface 148 of the valve body 140, as the valve body 140, the rigid retainer ring 160, and the ring 150 are being pushed toward the contact seat, the ring 150 arrives first at the contact seat, i.e., before the contact surface 148 of the valve body 140, causing the valve body 140 to slide relative to the ring 150 (and the retainer ring 160) as the valve body 140 continues to move downward to reach the contact seat, such that the contact surface 156 of the ring 150 and the contact surface 148 of the valve body 140 both contact the contact seat. In that the valve body 140 can slide relative to the ring 150 (and the retainer ring 160), and notably due to axial wear of the contact surface 148 of the valve body 140, a space S can be created between the retainer ring 160 and the valve body 140, such as shown in FIG. 12. From the positioning shown in FIG. 12, for the next cycle, when the bottom valve 100 is caused to open by movement of the plunger 41 to the right, also in the case of the contact surface 148 of the valve body 140 has been worn, each of the valve body 140, the rigid retainer ring 160 (FIG. 12), and the ring 150 (FIG. 12) of the bottom valve 100 can be pushed upward by the pressure difference from the seated position shown in FIG.

12 to open the bottom valve 100. Here, because the spring 120 can contact the retainer ring 160 (and hence the ring 150) and not the valve body 140, due to the slight pressure difference, the valve body 140 can slide upward toward the retainer ring 160. Such upward sliding of the valve body 140 may close some or all of the space S.

Embodiments of the disclosed subject matter can also be as set forth according to the following parentheticals.

(1) A valve assembly with self-adjusting valve portion comprising: a valve movable in an axial direction of the valve assembly relative to a contact surface as a seat; and a biasing member, which may be a spring, in contact with the valve and movable in the axial direction of the valve assembly responsive to operation of the valve, wherein the valve includes: a valve body having a radial side surface and a valve contact surface, on a bottom side of the valve body, configured to contact the contact surface, the valve contact surface being adjacent to the radial side surface of the valve body, a ring as the self-adjusting valve portion, the ring circumscribing the valve body such that an inner surface of the ring directly contacts the radial side surface of the valve body, wherein a bottom surface of the ring contacts the contact surface under a condition that the valve is seated on the contact surface, and a retainer ring bonded to the ring such that an upper surface of the ring is in contact with the retainer ring, wherein an entirety of the ring and an entirety of the retainer ring are operative to move together relative to the valve body at least under the condition that the valve is seated on contact surface.

(2) The valve assembly according to (1), wherein a height of the ring in the axial direction of the valve assembly is such that no portion of the radial side surface of the valve body is exposed to outside the valve.

(3) The valve assembly according to (1) or (2), wherein a bottom end of the biasing member is operative to contact a top surface of the retainer ring at all times during operation of the valve.

(4) The valve assembly according to any one of (1) to (3), wherein a top surface of the retainer ring includes a ridge, and wherein a bottom end of the biasing member circumscribes the ridge and directly contacts the top surface of the retainer ring.

(5) The valve assembly according to any one of (1) to (4), wherein a first inner diameter of the retainer ring is less than a second inner diameter of the ring.

(6) The valve assembly according to any one of (1) to (5), wherein a first outer diameter of the retainer ring is greater than a second outer diameter of the ring.

(7) The valve assembly according to any one of (1) to (6), wherein a first outer diameter of the retainer ring and/or a second outer diameter of the ring are/is less than a maximum outer diameter of a hollow base forming the contact surface as the seat.

(8) The valve assembly according to any one of (1) to (7), wherein the bottom surface of the ring complements a portion of the contact surface.

(9) The valve assembly according to any one of (1) to (8), wherein the retainer ring is made of heat-treated carbon steel or stainless steel.

(10) A method regarding a valve assembly, comprising: providing a valve body of the valve assembly, the valve body defining a radial side surface and a valve contact surface on a first side of the valve body, the valve contact surface being adjacent to the radial side surface of the valve body; providing a ring, the ring circumscribing the valve body such that an inner surface of the ring directly contacts the radial side surface of the valve body; and providing a retainer ring, the retainer ring being fixed to the ring such that at least a portion of an upper surface of the ring is covered by the retainer ring, wherein the ring is slidably movable along the radial side surface of the valve body, in concert with the retainer ring.

(11) The method according to (10), further comprising moving the valve body toward a seat of a valve base, wherein said moving the valve body toward the seat of the valve base causes the ring to slide along the radial side surface of the valve body, in concert with the retainer ring, responsive to the valve contact surface of the valve body contacting a base contact surface of the valve base.

(12) The method according to (10) or (11), further comprising moving the valve body away from a seat of the valve base, wherein said moving the valve body away from the seat of the valve base causes the ring and the retainer ring to move in concert with the valve body without the ring and the retainer ring moving relative to the valve body.

(13) The method according to any one of (10) to (12), wherein a height of the ring in an axial direction of the valve assembly is such that no portion of the radial side surface of the valve body is exposed, wherein a first outer diameter of the retainer ring is greater than a second outer diameter of the ring, and/or wherein a first inner diameter of the retainer ring is less than a second inner diameter of the ring.

(14) The method according to any one of (10) to (13), wherein an inner surface of the ring defining an inner diameter of the ring is constant from a first end of the ring to a second end of the ring.

(15) A valve assembly comprising: a valve body having a side surface and a valve body contact surface; a ring, the ring surrounding the valve body such that an inner surface of the ring is slidably engaged with the side surface of the valve body; and a retainer at a first surface of the ring and movable with the ring relative to the valve body such that the retainer moves with the ring as the ring slides along the side surface of the valve body.

(16) The valve assembly according to (15), wherein the retainer is comprised of heat-treated carbon steel or stainless steel, and/or wherein the valve body is comprised of a metal.

(17) The valve assembly according to (15) or (16), wherein an outer edge of the valve body contact surface forms a bottom of the side surface of the valve body, and wherein an entirety of the side surface of the valve body is covered by the inner surface of the ring or by a combination of the inner surface of the ring and a projecting portion of the retainer.

(18) The valve assembly according to any one of (15) to (17), wherein the inner surface of the ring, which defines an inner diameter of the ring, is constant from a first end of the ring to a second end of the ring opposite the first end of the ring, and/or wherein an outer surface of the ring, which defines an outer diameter of the ring, is constant from the top surface of the ring to a bottom surface of the ring.

(19) The valve assembly according to any one of (15) to (18), wherein a portion of the first surface of the ring is covered by the retainer, and wherein the retainer includes a projecting tab extending from a second surface of the retainer, the projecting tab extending into the ring from the first surface of the ring.

(20) The valve assembly according to any one of (15) to (19), wherein a first inner diameter of the retainer is less than a second inner diameter of the ring, and/or wherein a first outer diameter of the retainer is greater than a second outer diameter of the ring.

(21) The valve assembly according to any one of (15) to (20), wherein the ring is comprised of urethane.

(22) The valve assembly according to any one of (15) to (21), wherein the outer surface of the ring is constant from a first end of the ring to a second end of the ring opposite the first end of the ring.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A valve assembly with self-adjusting valve portion comprising:
    a valve movable in an axial direction of the valve assembly relative to a contact surface as a seat; and
    a biasing member movable in the axial direction of the valve assembly responsive to operation of the valve,
    wherein the valve includes:
        a valve body having a radial side surface and a valve contact surface, on a bottom side of the valve body, configured to contact the contact surface, the valve contact surface being adjacent to the radial side surface of the valve body,
        a ring as the self-adjusting valve portion, the ring circumscribing the valve body such that an inner surface of the ring directly contacts the radial side surface of the valve body, wherein a bottom surface of the ring contacts the contact surface under a condition that the valve is seated on the contact surface, and
        a rigid retainer ring bonded to the ring such that an upper surface of the ring is in contact with the rigid retainer ring, the rigid retainer ring being distinct from and more rigid than the ring,
    wherein in a first state of the valve contact surface of the valve body, an entirety of the ring and an entirety of the rigid retainer ring are operative to move together with the valve body away from contact surface in the axial direction, and
    wherein in a second state of the valve contact surface where the valve contact surface has worn in the axial direction due to prior operation of the valve assembly, during the operation of the valve assembly under a condition that the bottom surface of the ring becomes seated on the contact surface, the valve body is operative to move toward the contact surface, relative to the ring and the rigid retainer ring, to create a space between an upper surface of the valve body and a bottom surface of the rigid retainer ring.

2. The valve assembly according to claim 1, wherein a height of the ring in the axial direction of the valve assembly is such that no portion of the radial side surface of the valve body is exposed to outside the valve.

3. The valve assembly according to claim 1, wherein a bottom end of the biasing member is operative to contact a top surface of the rigid retainer ring at all times during operation of the valve.

4. The valve assembly according to claim 1,
    wherein a top surface of the rigid retainer ring includes a ridge, and
    wherein a bottom end of the biasing member circumscribes the ridge and directly contacts the top surface of the rigid retainer ring.

5. The valve assembly according to claim 1, wherein a first inner diameter of the rigid retainer ring is less than a second inner diameter of the ring.

6. The valve assembly according to claim 1, wherein a first outer diameter of the rigid retainer ring is greater than or equal to a second outer diameter of the ring.

7. The valve assembly according to claim 1, wherein the biasing member is a coil spring.

8. The valve assembly according to claim 1, wherein the bottom surface of the ring complements a portion of the contact surface.

9. The valve assembly according to claim 1, wherein no portion of the rigid retainer ring is movable relative to any portion of the rigid retainer ring during operation of the valve assembly.

10. A method regarding a valve assembly, comprising:
    providing a valve body of the valve assembly, the valve body defining a radial side surface and a valve contact surface on a first side of the valve body, the valve contact surface being adjacent to the radial side surface of the valve body;
    providing a ring, the ring circumscribing the valve body such that an inner surface of the ring directly contacts the radial side surface of the valve body;
    providing a retainer ring, the retainer ring being fixed to the ring such that at least a portion of an upper surface of the ring is covered by the retainer ring; and operating the valve assembly said operating the valve assembly including moving the valve body toward a base contact surface of a valve base, wherein said moving the valve body toward the valve contact surface of the valve base causes the valve body to slide along the inner surface of the ring toward the base contact surface of the valve base upon the ring contacting the base contact surface of the valve base prior to the valve contact surface contacting the base contact surface of the valve base, wherein the valve body is slidably movable along the inner surface of the ring during said operating the valve assembly subsequent to the valve contact surface of the valve body wearing from prior operation of the valve assembly, and wherein the valve body sliding along the inner surface of the ring toward the base contact surface creates a space between an upper surface of the valve body and a bottom surface of the retainer ring.

11. The method according to claim 10, wherein said operating the valve assembly includes moving the valve body away from the base contact surface of the valve base, and wherein said moving the valve body away from the base contact surface of the valve base is such that no portion of the retainer ring moves relative to any portion of the ring.

12. The method according to claim 10, wherein a height of the ring in an axial direction of the valve assembly is such that no portion of the radial side surface of the valve body is exposed, wherein a first outer diameter of the retainer ring is greater than or equal to a second outer diameter of the ring, and wherein a first inner diameter of the retainer ring is less than a second inner diameter of the ring.

13. The method according to claim 10, wherein the ring is comprised of urethane, wherein the retainer ring is metallic, wherein the inner surface of the ring defining an inner diameter of the ring is constant from a first end of the ring to a second end of the ring, and wherein the retainer ring is distinct from and more rigid than the ring.

14. A valve assembly comprising:

a valve body having a side surface and a valve body contact surface;

a ring surrounding the valve body such that an inner surface of the ring is slidably engaged with the side surface of the valve body; and a rigid retainer at a first surface of the ring and movable with the ring relative to the valve body such that the rigid retainer moves with the ring as the ring slides along the side surface of the valve body, the rigid retainer being distinct from and more rigid than the ring, wherein the valve body is movable relative to the ring and the rigid retainer during operation of the valve assembly between a first position where an upper surface of the valve body contacts a bottom surface of the rigid retainer and a second position where no portion of the upper surface of the valve body contacts the bottom surface of the rigid retainer.

15. The valve assembly according to claim 14, wherein the ring is comprised of urethane.

16. The valve assembly according to claim 14, wherein an outer edge of the valve body contact surface forms a bottom of the side surface of the valve body, and wherein an entirety of the side surface of the valve body is covered by the inner surface of the ring or by a combination of the inner surface of the ring and a projecting portion of the rigid retainer.

17. The valve assembly according to claim 14, wherein the inner surface of the ring, which defines an inner diameter of the ring, is constant from a first end of the ring to a second end of the ring opposite the first end of the ring.

18. The valve assembly according to claim 14, wherein a portion of the first surface of the ring is covered by the rigid retainer, and wherein the rigid retainer includes a rigid projecting tab extending from a second surface of the rigid retainer, the rigid projecting tab extending into the ring from the first surface of the ring.

19. The valve assembly according to claim 14, wherein a first inner diameter of the rigid retainer is less than a second inner diameter of the ring, and/or wherein a first outer diameter of the rigid retainer is greater than or equal to a second outer diameter of the ring.

20. The valve assembly according to claim 14, wherein the outer surface of the ring is constant from a first end of the ring to a second end of the ring opposite the first end of the ring.

* * * * *